US012623507B2

(12) United States Patent
Neilson et al.

(10) Patent No.: US 12,623,507 B2
(45) Date of Patent: May 12, 2026

(54) VEHICLE CONTROL SYSTEM AND METHOD

(71) Applicant: JAGUAR LAND ROVER LIMITED, Warwickshire (GB)

(72) Inventors: Robert Neilson, Coventry (GB); James Robertson, Coventry (GB); Stefan Kojchev, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 468 days.

(21) Appl. No.: 17/438,097

(22) PCT Filed: Feb. 5, 2020

(86) PCT No.: PCT/EP2020/052824
§ 371 (c)(1),
(2) Date: Sep. 10, 2021

(87) PCT Pub. No.: WO2020/182374
PCT Pub. Date: Sep. 17, 2020

(65) Prior Publication Data
US 2022/0185053 A1 Jun. 16, 2022

(30) Foreign Application Priority Data
Mar. 12, 2019 (GB) .................................... 1903362

(51) Int. Cl.
*B60G 17/0195* (2006.01)
*B60G 17/016* (2006.01)
*B60G 17/018* (2006.01)

(52) U.S. Cl.
CPC ..... *B60G 17/0195* (2013.01); *B60G 17/0162* (2013.01); *B60G 17/0182* (2013.01);
(Continued)

(58) Field of Classification Search
CPC ............ B60G 17/0195; B60G 17/0162; B60G 17/0182; B60G 2400/104;
(Continued)

(56) References Cited

U.S. PATENT DOCUMENTS 5,173,857 A * 12/1992 Yuji ..................... B60G 17/016
9,193,381 B2 * 11/2015 Michael ............. B60G 17/0162
(Continued)

FOREIGN PATENT DOCUMENTS

CN         106458207 A       2/2017
CN         107000589 A       8/2017
(Continued)

OTHER PUBLICATIONS

Combined Search and Examination Report under Sections 17 and 18(3) for Application No. GB1903362.0 dated Sep. 4, 2019.
(Continued)

*Primary Examiner* — Rachid Bendidi
*Assistant Examiner* — Kirsten Jade M Santos
(74) *Attorney, Agent, or Firm* — Carlson, Gaskey & Olds, P.C.

(57) ABSTRACT

Embodiments of the present invention provide a control system (100) for determining a suspension calibration of a vehicle (800). The control system (100) has one or more controllers (120) that receive route data indicative of a route ahead of the vehicle (800). One or more processors (130) determine, from the route data, a prediction of a first acceleration at a first location (320) ahead of the vehicle (800) and a second acceleration at a second location (330) ahead of the first location(320). The one or more processors (130) determine a suspension calibration of the vehicle (800) in dependence on the second acceleration. The actual acceleration of the vehicle (800) is measured at the first location (320) and compared with the first acceleration. If the mea-
(Continued)

sured and first acceleration are within a predetermined tolerance, the processor (120) produces a suspension control signal at output (121) which is received by a suspension controller (140) to apply the suspension calibration prior to the vehicle (800) arriving at the second location (330).

18 Claims, 6 Drawing Sheets

(52) U.S. Cl.
      CPC .. *B60G 2400/104* (2013.01); *B60G 2400/106* (2013.01); *B60G 2401/16* (2013.01)

(58) Field of Classification Search
      CPC .......... B60G 2400/106; B60G 2401/16; B60G 17/0165; B60G 17/02; B60G 17/06; B60G 2400/82; B60G 2500/10; B60G 2800/70; B60G 2800/7022; B60W 10/22
      See application file for complete search history.

(56) References Cited

U.S. PATENT DOCUMENTS

| | | | | |
|---|---|---|---|---|
| 2007/0096405 | A1* | 5/2007 | Lawrence | .......... B60G 17/0165 |
| 2011/0022266 | A1 | 1/2011 | Ippolito et al. | |
| 2013/0041545 | A1 | 2/2013 | Bar et al. | |
| 2018/0056745 | A1 | 3/2018 | Saylor et al. | |
| 2018/0141543 | A1* | 5/2018 | Brian | .................... B60G 17/016 |
| 2018/0162187 | A1* | 6/2018 | Klaus | ..................... B60G 11/16 |
| 2018/0215373 | A1 | 8/2018 | Varnhagen et al. | |
| 2019/0064823 | A1* | 2/2019 | Shengbing | ............ B60W 10/04 |

FOREIGN PATENT DOCUMENTS

| | | | |
|---|---|---|---|
| CN | 107097603 | A | 8/2017 |
| EP | 3002139 | A1 | 4/2016 |
| GB | 2494528 | A | 3/2013 |
| JP | 2007062445 | A | 3/2007 |
| WO | 2017214678 | A1 | 12/2017 |

OTHER PUBLICATIONS

International Search Report and Written Opinion of the International Searching Authority for International application No. PCT/EP2020/052824 dated May 12, 2020.
Notice of First Examination Opinion for CN Application No. 202080028147.5 dated Apr. 15, 2023.

\* cited by examiner

800

VEHICLE CONTROL SYSTEM AND METHOD

TECHNICAL FIELD

The present disclosure relates generally to a control system and method and more particularly, but not exclusively, to a control system and method for calibrating a vehicle suspension. Aspects of the invention relate to a control system for applying a suspension calibration, a vehicle comprising the system, a method of calibrating a vehicle suspension and a computer program product, a non-transitory computer readable medium and a processor for implementing the method or computer program product.

BACKGROUND

Conventional vehicle active and semi-active suspension systems first require the detection of a vehicle disturbance or road/environmental condition before the suspension system responds accordingly. In such cases, movement of the vehicle body is detected by one or more sensors and the action of the suspension system is controlled.

In the case of road handling, active and semi-active suspension systems can be adjusted in dependence on prevailing road conditions, improving the comfort and composure of a vehicle to which they are installed.

However, these systems are reactive by nature. As a result, it has been found that by the time a disturbance or road condition is detected, it is too late for it to be counteracted such that comfort and composure are not compromised to some degree.

It is therefore an object of embodiments of the present invention to provide a pre-emptive vehicle suspension calibration based on a predicted acceleration of the vehicle at a location ahead of the vehicle, the calibration being applied prior to the vehicle arriving at the location.

It is a further object of embodiments of the invention to at least mitigate one or more of the problems of the prior art.

SUMMARY OF THE INVENTION

Aspects and embodiments of the invention provide a control system, a method, a vehicle, a computer program, a non-transitory computer readable medium and a processor as claimed in the appended claims.

According to an aspect of the invention there is provided a control system for a vehicle, the control system comprising one or more controllers, the control system configured to: receive route data indicative of a route ahead of the vehicle; determine, in dependence on the route data, a prediction of a first acceleration of the vehicle at a first location; determine, in dependence on the route data, a prediction of a second acceleration of the vehicle at a second location, wherein the second location is further distal to a current location of the vehicle than the first location; determine a suspension calibration in dependence on the second acceleration; receive measured acceleration data when the vehicle reaches the first location; compare the measured acceleration data and the first acceleration; and output a suspension control signal in dependence on the determined suspension calibration and the comparison.

Advantageously, the present invention allows for a prediction of an acceleration of a vehicle at a location ahead of the vehicle in dependence on route data indicative of a route ahead of the vehicle. The control system then allows for the application of a suspension calibration, determined in dependence on the predicted acceleration, prior to the vehicle reaching the location ahead of the vehicle. Such a pre-emptive suspension calibration mitigates the problems associated with the reactive nature of prior art systems regarding comfort and composure.

Further, the comparison of a measured acceleration and predicted acceleration at a location ahead of the vehicle provides a verification step, allowing the control system to verify that the vehicle is travelling on a route as expected from the route data.

This verification step is advantageous as if it is determined from the comparison of the measured acceleration and predicted acceleration that the vehicle is not travelling on a route as expected or anticipated based on the route data, a decision can be made as to whether or not to apply a determined suspension calibration.

The one or more controllers may comprise: an electrical input configured to receive: an electrical signal indicative of the route data; and an electrical signal indicative of the measured acceleration data.

The one or more controllers may comprise: one or more processors configured to determine: the prediction of the first acceleration of the vehicle at the first location; the prediction of the second acceleration of the vehicle at the second location, wherein the second location is further distal to a current location of the vehicle than the first location; the suspension calibration in dependence on the second acceleration; and compare the measured acceleration data and the first acceleration; and an electrical output configured to output the suspension control signal.

The electrical input may comprise a wireless receiver, for example for receiving a wireless signal. The electrical output may comprise a wireless transmitter, for example for transmitting a wireless signal.

The control system may be configured to output the suspension control signal if the measured acceleration data and the first acceleration are within a predetermined tolerance.

Making use of a predetermined tolerance is advantageous in that it accounts for inaccuracies in the measured acceleration data and first acceleration.

The control system may be configured to determine, in dependence on the route data, a motion profile of the vehicle between the current location of the vehicle and the second location.

The determination of a motion profile is advantageous in that it provides a continuous mapping of the vehicle motion between the current vehicle location and second location. Such a continuous mapping can provide predictions of vehicle motion at points along the vehicle route between the current vehicle location and second location.

The determination of the prediction of the first acceleration may be in dependence on the motion profile.

The control system may be configured to: receive measured acceleration data at a further location between the first location and the second location; determine, in dependence on the route data, a prediction of a further acceleration of the vehicle at the further location; compare the measured acceleration data at the further location with the further acceleration; and output a suspension control signal to apply the determined calibration prior to the vehicle arriving at the second location in dependence on the measured and predicted accelerations.

The further location may comprise a plurality of further locations between the first location and the second location.

The one or more further locations may be determined based on a predetermined time interval, predetermined time step or predetermined distance interval or predetermined distance step between the first location and second location.

Advantageously, comparing the measured acceleration and predicted acceleration at one or more further locations allows the control system to identify whether the vehicle is travelling on a route as expected from the route data or whether the vehicle has taken a diversion from route. Such a comparison at further location(s) allows the controller to mitigate the occurrence of 'false positives', i.e. by not applying the determined suspension calibration when it is determined that the vehicle is travelling on an alternative route to that as expected from the route data.

In embodiments, the location of the first location relative to the second location may be dynamic, for example, dependent on a vehicle mode. The location of the first location relative to the second location may be determined in dependence on one or more characteristics of the route ahead of the vehicle, for example road geometry or topography.

The location of the one or more further locations may be determined in dependence on a vehicle mode. The location of the one or more further locations may be determined in dependence one or more characteristics of the route ahead of the vehicle, for example road geometry, road features and/or topography. Road features may comprise side roads, forks or junctions or any other feature in which it is possible for the vehicle to travel on an alternative route to that as expected from the route data.

Advantageously, such a feature allows the system to remain relevant to route ahead of the vehicle. Determining the location of one or more further locations in dependence of one or more characteristics of the route ahead of the vehicle helps to reduce the likelihood of 'false positives'.

If the measured acceleration(s) and predicted acceleration(s) are outside of a predetermined tolerance, the processing means may be arranged to determine that the vehicle is no longer travelling on a route as per the route data.

Such a feature is advantageous in that it reduces the likelihood of a suspension calibration being implemented that is not appropriate or optimal for the actual route ahead of the vehicle.

The control system may be configured to receive maximum acceleration data indicative of a maximum acceleration value, e.g. a maximum allowable acceleration value for a given vehicle mode.

The maximum acceleration value may be a user-determined value, for example a user-controlled value or user-inputted value.

The maximum acceleration value may be selected dependent on a vehicle mode. The vehicle mode may be an operational mode of the vehicle. The vehicle mode may be a comfort mode, a sport mode or a dynamic mode. Each vehicle mode may comprise a predetermined maximum acceleration value. The maximum acceleration value may be greater in a sport mode or dynamic mode than a comfort mode.

The maximum acceleration value may be selected in dependence on the prevailing weather conditions or the predicted weather condition at or proximate the second location.

Such a feature is advantageous in that it optimises the determined suspension calibration based on conditions at the current location or at the second location.

The control system may be configured to compare the second acceleration with the maximum acceleration value and, if the second acceleration exceeds the maximum acceleration value, to determine the suspension calibration at the second location in dependence on the maximum acceleration value, i.e. the suspension calibration is determined based on the vehicle having the maximum acceleration value at the second location.

In embodiments, if the second acceleration is predicted to exceed the maximum acceleration value, the motion profile is determined in dependence on the vehicle having the maximum acceleration value at the second location i.e. the processing means is arranged to take into account necessary deceleration of the vehicle such that it has maximum acceleration value at the second location.

If the measured acceleration data and predicted acceleration are outside of a predetermined tolerance, an existing suspension calibration may be maintained.

If the measured acceleration(s) and predicted acceleration(s) at the first location or further location(s) are outside of a predetermined tolerance, the processing means may be arranged to determine that the vehicle is no longer travelling on the predicted vehicle path.

The control system may be configured to determine the prediction of the second acceleration in dependence on a current speed of the vehicle and the route data.

In embodiments, the control system may be configured to predict a vehicle path from the current location to the second location in dependence on the route data.

The route data may comprise navigational data.

The route data may be indicative of a predicted, probable or likely route, e.g. one of a plurality of potential routes ahead of the vehicle. The route data may be indicative of a pre-programmed route, for example a route programmed in a navigation system of a vehicle.

The acceleration may be one or more of lateral acceleration and longitudinal acceleration.

Alternatively, the prediction of a first acceleration and/or second acceleration may be a prediction of a first motion value and/or second motion value of the vehicle, for example one or more of a yaw rate, roll rate or lateral velocity of the vehicle. The determination of the suspension calibration may be in dependence on the second motion value. Receiving measured acceleration data may comprise receiving measured motion data.

Optionally, the motion profile comprises an acceleration and deceleration profile.

The determination of the suspension calibration may comprise determination of one or more suspension characteristics.

The one or more suspension characteristics may comprise a suspension controller gain.

The determination of the one or more suspension characteristics may comprise a determination of one or more of suspension damping and stiffness. The determination of the one or more suspension characteristics may comprise a determination of suspension force, for example the reactive force supplied by the suspension system.

The determination of one or more suspension characteristics may, advantageously, improve the handling of the vehicle.

In some embodiments, the control system may comprise: a suspension controller for a vehicle suspension comprising one or more suspension actuators, the suspension controller being configured to receive the suspension calibration and control the one or more suspension actuators to implement the suspension calibration.

According to another aspect of the invention there is provided a method of calibrating a vehicle suspension, the method comprising: determining, in dependence on route data indicative of a route ahead of the vehicle, a prediction of a first acceleration of the vehicle at a first location;

determining, in dependence on the route data, a prediction of a second acceleration of the vehicle at a second location, wherein the second location is further distal to a current location of the vehicle than the first location; determining a suspension calibration in dependence on the second acceleration; measuring an acceleration of the vehicle when it reaches the first location; comparing the measured acceleration at the first location with the first acceleration; and outputting a suspension control signal in dependence on the determined suspension calibration and the comparison.

Optionally, the method may comprise outputting the suspension control signal if the measured acceleration data and the first acceleration are within a predetermined tolerance.

In embodiments, the method may comprise determining, in dependence on the route data, a motion profile of the vehicle between the current location of the vehicle and the second location.

Optionally, the method may comprise determining the prediction of the first acceleration in dependence on the motion profile.

The method may comprise: determining, in dependence on route data indicative of a route ahead of the vehicle, a prediction of a further acceleration of the vehicle at a further location between the first location and the second location; measuring an acceleration of the vehicle when it reaches the further location; comparing the measured acceleration data at the further location with the further acceleration; and outputting a suspension control signal in dependence on the determined suspension calibration and the comparison.

Optionally, the method may comprise outputting the suspension control signal if the measured acceleration data and the further acceleration are within a predetermined tolerance.

The method may comprise comparing the second acceleration with a maximum acceleration value.

The method may comprise determining the suspension calibration at the second location in dependence on the maximum acceleration value if the second acceleration exceeds the maximum acceleration value.

The method may comprise determining the motion profile in dependence on the vehicle having the maximum acceleration value at the second location if the second acceleration is predicted to exceed the maximum acceleration value.

In embodiments, the method comprises maintaining an existing suspension calibration if the measured acceleration data and predicted acceleration are outside of a predetermined tolerance.

The method may comprise determining the prediction of the second acceleration in dependence on a current speed of the vehicle and the route data.

The method may comprise predicting a vehicle path from the current location of the vehicle to the second location in dependence on the route data.

The route data may comprise navigational data.

The acceleration may be one or more of a lateral acceleration and longitudinal acceleration.

The motion profile may comprise an acceleration and deceleration profile.

The method may comprise, in determining the suspension calibration, determining one or more suspension characteristics.

The one or more suspension characteristics may comprise a suspension controller gain.

The method may comprise, in determining the one or more suspension characteristics, determining one or more of suspension damping and stiffness.

According to an aspect of the invention there is provided a vehicle comprising a control system as described above or arranged to perform a method as described above.

According to yet another aspect of the invention there is provided a computer program product executable on a processor so as to implement the method described above.

According to another aspect of the invention there is provided a non-transitory computer readable medium carrying computer readable code which when executed causes a vehicle to carry out the method described above.

According to yet another aspect of the invention there is provided a processor arranged to implement the method described above, or the computer program product described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION

Figure 1:
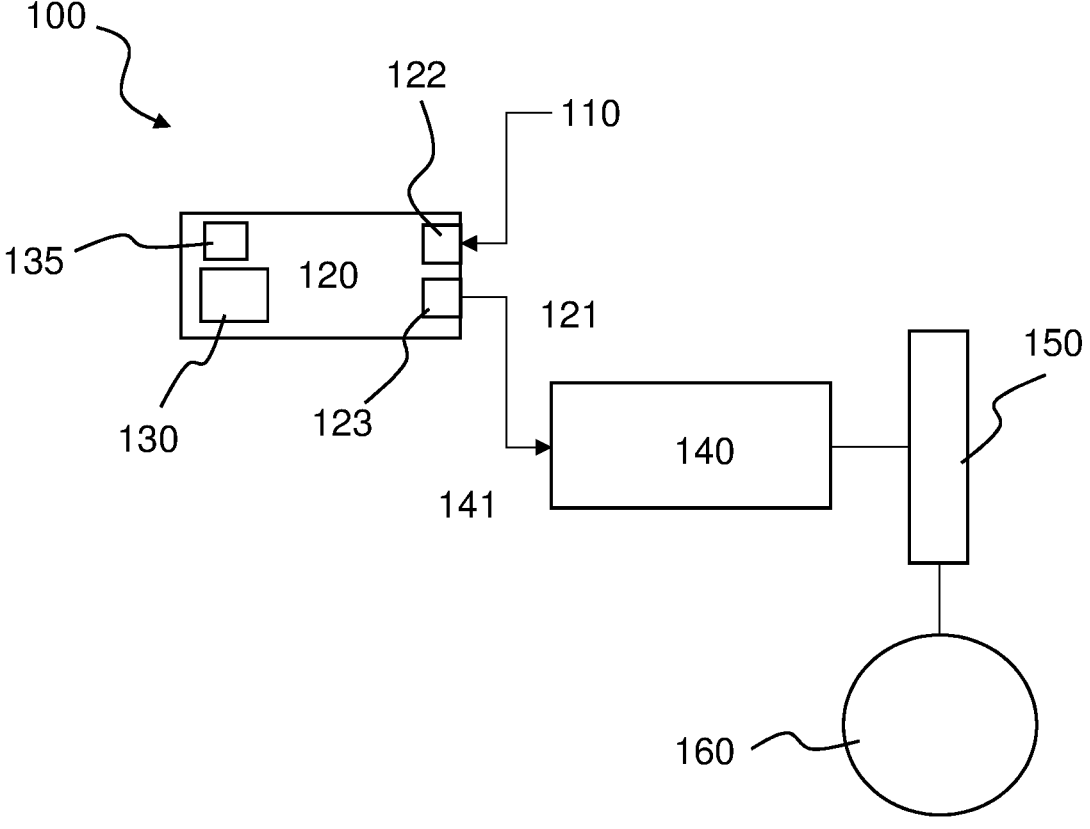
FIG. 1 is a schematic of a control system for calibrating a vehicle suspension.

Referring now to FIG. 1, there is shown a schematic system diagram of a control system 100 according to an embodiment of the invention for calibrating a vehicle suspension 150. The control system 100 includes an electrical input 122 of controller 120 that in use receives an electrical signal 110. The electrical input 122 may be in the form of an electrical pin connection to an input means of the controller 120 which may comprise one or more electrical devices for receiving the electrical signal 110. The controller 120 has a processor 130 and memory 135 for storing data therein. The processor is an electronic processor for executing computer-readable instructions. The processor 130 is configured to access memory 135 to execute computer-readable instructions stored therein. The memory 135 may also be used to store data for operation thereon by the processor 130.

Figure 8:
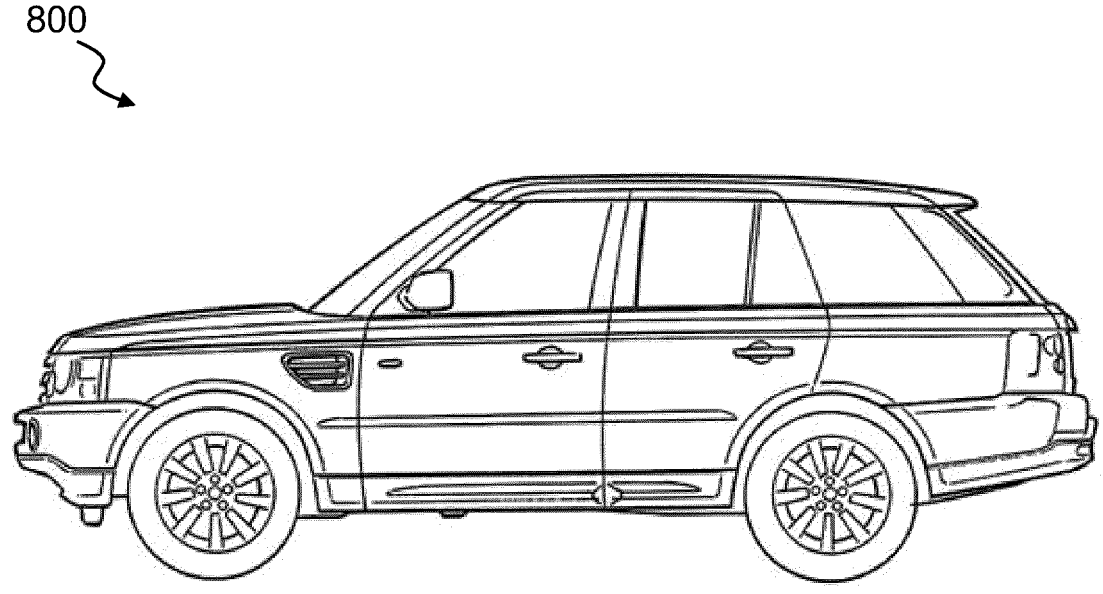
FIG. 8 is a vehicle according to an embodiment of the present invention.

The electrical signal 110 is indicative of, or represents, route data, for example indicative of a route ahead of or a navigable path ahead of the vehicle 800, such as shown in FIG. 8, i.e. the vehicle 800 being a vehicle 800 within which the control system 100 is installed or implemented. The route data may be received from a navigational system of the vehicle in this embodiment. The electrical signal may also be indicative of, or representative of measured acceleration data. The measured acceleration data is collected or received from one or more sensing means which may be associated with the vehicle 800. The one or more sensing means are arranged to determine one or more accelerations of the vehicle 800 and may comprise one or more sensing devices which may be in the form of one or more accelerometers in this embodiment. The memory 135 is arranged to store the route data and/or measured acceleration data presented by the electrical signal 110. The memory 135 may also store information and parameters relating to the control system 100.

The processor 130 is arranged to process the electrical signal 110 and to produce an output signal 121 at output means 123 which may be an electrical output 123 of the controller 120, which may comprise one or more electrical devices for outputting the electrical signal 121. The output signal 121 is received by an electrical input 141 of a suspension controller 140 of a vehicle suspension 150 in this embodiment.

The output signal 121 provides a suspension control signal in this embodiment. The suspension control signal is arranged to as to implement a suspension calibration determined by the processor 130. The output signal 121 from the controller 120 is received at the electrical input 141 of the suspension controller 140. The suspension controller 140 is arranged to calibrate or adjust the vehicle suspension 150 in dependence on the signal received at the input 141. The calibration of the vehicle suspension 150 affects or adjusts the dynamics experienced by the vehicle 800 through wheel 800.

Figure 2:
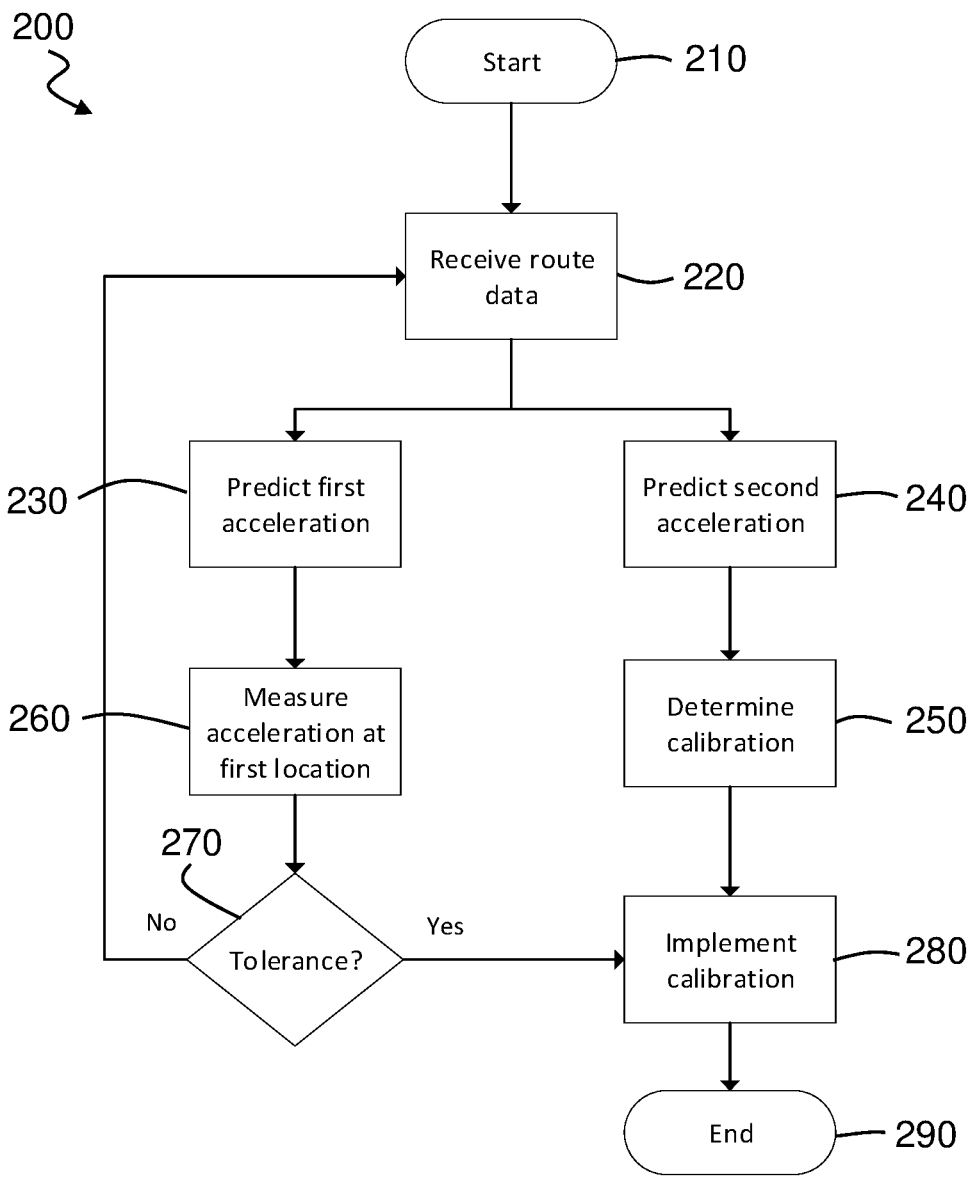
FIG. 2 is a flow chart illustrating a method of calibrating a vehicle suspension system according to an embodiment of the invention.

Referring now to FIG. 2 there is shown a method 200 of operation of control system 100 according to an embodiment of the invention. The method 200 may be implemented by the control system 100 in this embodiment.

The method 200 begins at 210, in which the vehicle is travelling along a navigable path or route in this embodiment. The method 200 then proceeds to step 220 in which route data is received by the controller 120 via the electrical input 110 as described above.

The route data is indicative of a route ahead or navigable path ahead of the vehicle 800. In particular, the route data is indicative or representative of the geometry of a route ahead of the vehicle, for example road curvature, bends and/or sweep of a route ahead of the vehicle 800.

It is also envisaged that the route data may be indicative or representative of the topography of the route ahead of the vehicle 800. The route ahead of the vehicle 800 may be a predicted route, anticipated route or a pre-programmed route, for example a route programmed in a navigation system of the vehicle 800.

At step 230, the processor 130 determines, based on the route data, a first acceleration of the vehicle 800 at a first location ahead of the vehicle 800. The first acceleration may be a lateral acceleration and/or a longitudinal acceleration of the vehicle 800. The determination of the first acceleration is a prediction based on the route data, i.e. the programmed, predicted or anticipated route ahead of the vehicle 800 in this embodiment.

The first acceleration may be determined based on route data in combination with the current vehicle speed and/or position and the route, for example programmed, predicted or anticipated, between a current vehicle location and the first location.

In parallel, i.e. concurrently, with the determination of the first acceleration at the first location at step 230, the processor 130 determines at step 240, in dependence on the route data, a second acceleration of the vehicle 800 at a second location ahead of the vehicle 800.

It is also envisaged that the determination of the first acceleration at the first location and the determination of the second acceleration at the second location are carried out separately, i.e. one after the other.

In the present embodiment, the second location is further distal to a current location of the vehicle 800 than the first location. The prediction or anticipation of the second acceleration at the second location is achieved or arrived at in the same manner as the prediction of the first acceleration. Additionally, the second acceleration is of the same type as the first acceleration, i.e. lateral acceleration and/or longitudinal acceleration of the vehicle 800.

At step 250, the processor 130 determines a suspension calibration in dependence on the second acceleration. The suspension calibration at the second location may be determined in dependence on a vehicle mode, i.e. a mode of operation of the vehicle, in this embodiment, so as to optimise the composure and comfort of the vehicle when it reaches or arrives at the second location.

The suspension calibration is suspension stiffness and/or suspension damping in this embodiment, although it is envisaged that any other suitable suspension parameter affecting vehicle composure and comfort may be determined. The suspension calibration is determined in dependence on the second acceleration, such that prior to the vehicle 800 reaching or arriving at the second location, the determined suspension calibration can be implemented.

The method 200 proceeds by the vehicle continuing on its route from the location at which the route data was received and when it reaches or arrives at the first location the acceleration of the vehicle at or proximate that point is measured, as per step 260. The acceleration is measured by one or more sensing means, in particular one or more accelerometers in this embodiment to produce measured acceleration data represented by electrical signal 110. The measured acceleration data is stored in memory 135

At step 270, the measured acceleration data and first acceleration are compared and it is determined by the processor 130 whether they are within a predetermined tolerance of one another. It is envisaged that the predetermined tolerance will take into account measurement errors and prediction errors, for example errors in the prediction of the first acceleration.

If the measured acceleration data and first acceleration are within the predetermined tolerance, the processor 130 determines that the vehicle 800 is travelling on the route as indicated or represented by the route data. Therefore, the comparison provides a verification step for the control system 100 such that the determined suspension calibration is only implemented if the vehicle is travelling on the route as indicated or represented by the route data.

If it is determined at step 270 that the measured acceleration data and the first acceleration are within the predetermined tolerance, then , at step 280, the controller 120 sends a suspension control signal at the electrical output 123 to the suspension controller 140 to implement the determined suspension calibration (determined at step 250) prior to the vehicle 800 arriving at the second location, for example a predetermined distance from the second location.

The controller 120 may be arranged to output the suspension control signal when the vehicle 800 is a predetermined distance from the second location. However, it is also envisaged that the distance from the second location in which the controller 120 is arranged to output the suspension control signal may be dependent on one or more characteristics of the route at the second location, for example curvature, bends and/or sweep as indicated or represented by the route data.

If it is determined at step 270 that the measured acceleration data and first acceleration are outside of or out with a predetermined tolerance, the processor 130 may be arranged to determine that the vehicle 800 is not or is no longer travelling on the route as indicated or represented by the route data. In the present embodiment, the method 200 reverts back to step 220 in which route data indicative or representative of a route ahead of the vehicle 800 is received. Further, the suspension calibration at or prior to the time of the comparison step 270 may be maintained without change.

Figure 3:
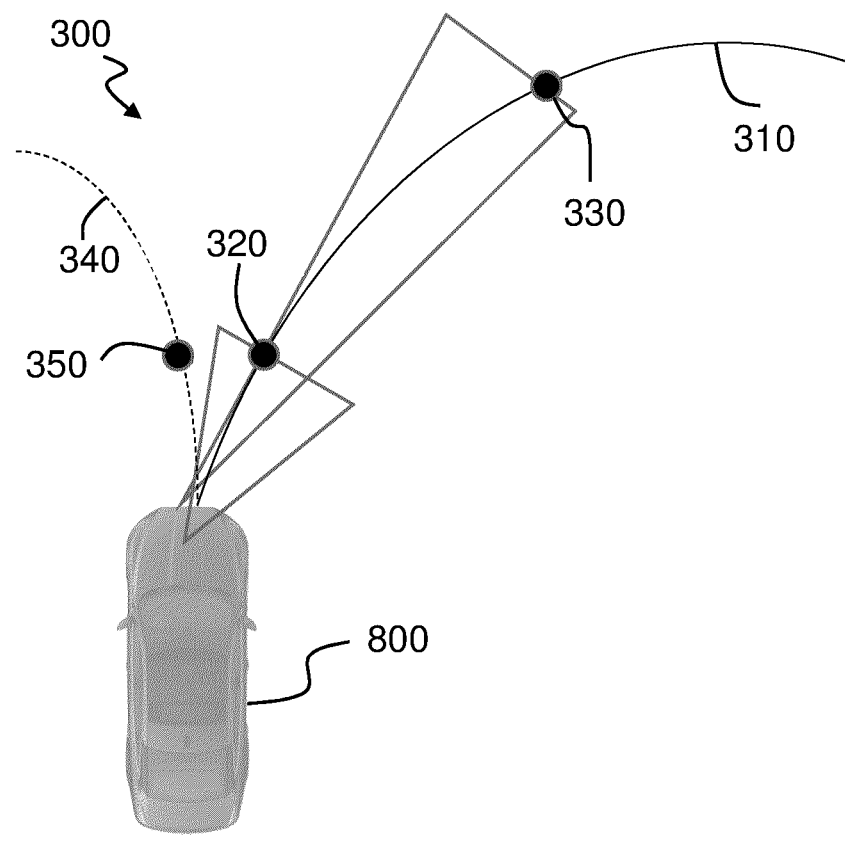
FIG. 3 is a plan view schematically showing a vehicle and planned trajectory according to an embodiment of the invention.

Referring now to FIG. 3, there is shown a schematic of a vehicle 800 having a trajectory 310 extending ahead thereof. The trajectory 310 is represented or indicated by route data as per step 220 of the method 200 above. In the present embodiment, the trajectory 310 is indicative or representative of a route ahead of the vehicle 800, i.e. a programmed, predicted or anticipated route, and is determined in dependence on the route data.

In embodiments, the programmed route may be a route programmed into a navigation system of the vehicle 800.

As described in step 230 of method 200, the control system 100 determines a first acceleration of the vehicle 800 at a first location 320 ahead of the vehicle 800. The first location 320 lies or is positioned along the trajectory 310, for example lies on the route represented by the route data.

The control system 100 also determines a second acceleration of the vehicle 800 at a second location 330 ahead of the vehicle 800, as per step 240 of method 200. The second location 330 also lies or is positioned along the trajectory 310, further distal from a current location of the vehicle 800 than the first location 320. Like the first location 320, the second location 330 also lies on the route represented by the route data.

As described in method 200, the actual acceleration of the vehicle 800 is measured at the first location 320 to produce measured acceleration data. The measured acceleration data is compared with the first acceleration. This verification step allows the control system 100 to determine that the vehicle 800 is in fact travelling as predicted or represented by the trajectory 310. If it is determined that the vehicle 800 is travelling as per the trajectory 310, the control system 100 is arranged to implement the determined suspension calibration (for example, determined at step 250 of method 200) prior to the vehicle 800 arriving at the second location 330.

FIG. 3 also illustrates the case in which the vehicle 800 travels on an alternative trajectory route, or path 340 from that indicated or represented by the route data, i.e. a trajectory different to trajectory 310. If the vehicle travels on an alternative trajectory 340, the measured acceleration data at first alternative location 350 will not match, or be within a predetermined tolerance of the first acceleration. The control system 100, applying method 300, will determine that the vehicle 800 is not travelling as per trajectory 310, and therefore will not implement the determined suspension calibration.

In embodiments, the distance between the first location 320 and second location 330 may be adjustable, for example in dependence on the trajectory 310, i.e. the nature of trajectory 310.

Figure 4:
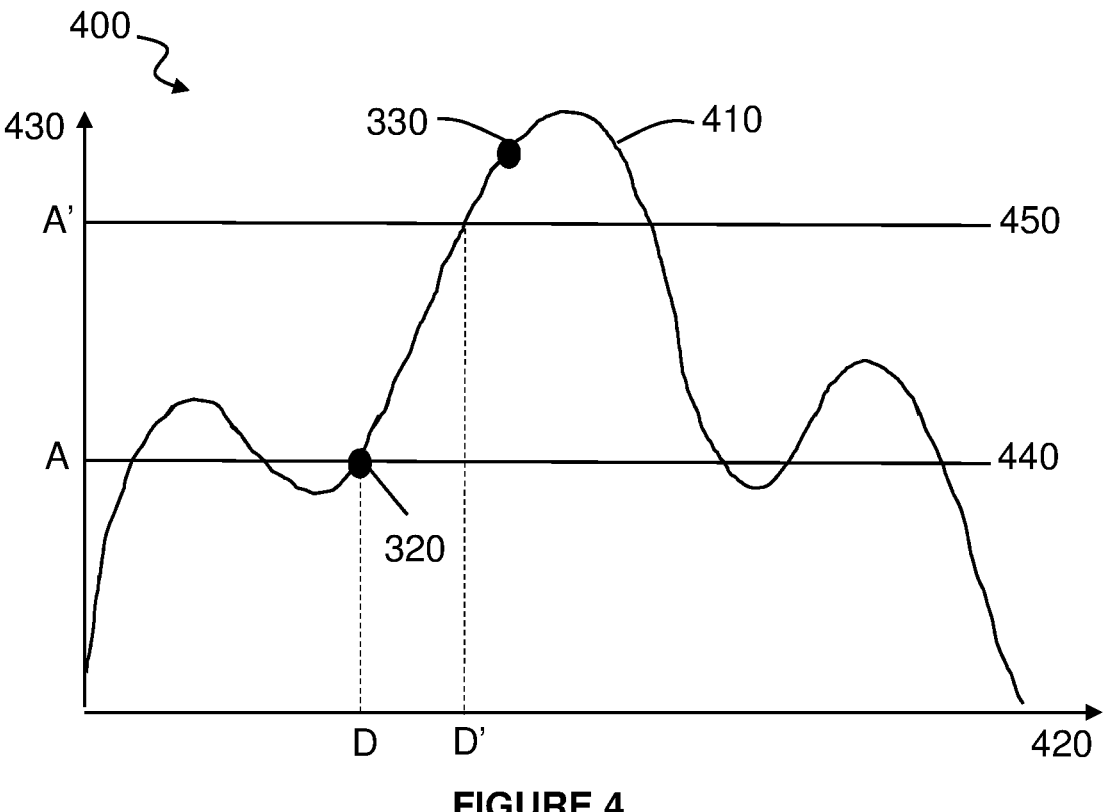
FIG. 4 is a motion profile according to an embodiment of the invention.

Referring now to FIG. 4, there is shown a motion profile 400 according to an embodiment of the invention. After step 220 of method 200, in which route data is received, the processor 130 may determine a motion profile 400. The motion profile 400 is an acceleration and deceleration profile in this embodiment.

The motion profile 400 graphically illustrates the predicted or anticipated acceleration and deceleration 410 of the vehicle 800 along a navigable path as represented by the route data. In the present embodiment, the horizontal axis 420 represents the distance along the route whilst the vertical axis 430 illustrates the acceleration of the vehicle 800 at each point along the route. The acceleration of the vehicle 800 may be a longitudinal acceleration, lateral acceleration or a vertical acceleration, or any combination thereof.

Shown on the motion profile 400 is first location 320 and second location 330 at their respective positions along the route. The creation of the motion profile 400 allows for continuous monitoring of vehicle acceleration as the vehicle 800 travels along the route.

In the present embodiment, in view of motion profile 400, it is expected that the acceleration of the vehicle 800 at point D along the route, i.e. the first location 320, will be A. This value is described by the application threshold 440 in which the control system 100, in particular the processor 130, determines that the vehicle 800 is travelling on the route as represented by the route data. The controller 120 is arranged to output suspension control signal at electrical output 123 to apply the determined suspension calibration to the vehicle suspension 150 prior to the vehicle 800 arriving at the second location 330.

The point of activation, i.e. the point at which the suspension calibration is applied, is represented by the trigger threshold 450.

Figure 5:
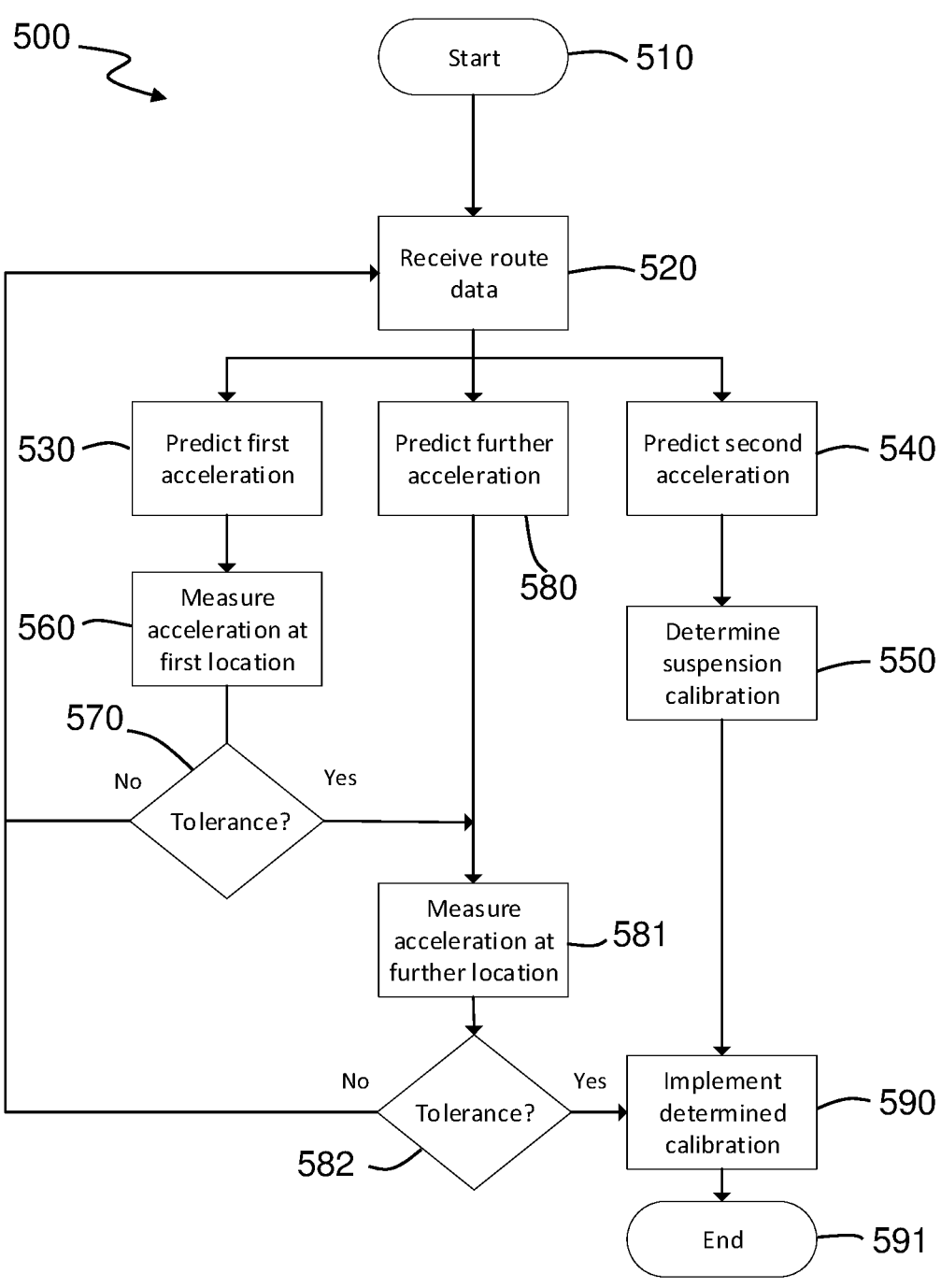
FIG. 5 is a flow chart illustrating a method of calibrating a vehicle suspension system according to another embodiment of the invention.

Referring now to FIG. 5 there is shown a method of operation of control system 100 according to another embodiment of the invention. The method 500 may be implemented control system 100 in this embodiment.

Steps 510, 520, 530, 540, 550, 560 & 570 of method 500 are equivalent to steps 210, 220, 230, 240, 250, 260 & 270 of method 200 and therefore, for conciseness, will not be described further.

Method 500 differs from method 200 in that at step 580, the processor 130 determines, in dependence on route data, a further acceleration of the vehicle at a further location ahead of the vehicle 800. In the present embodiment, the further acceleration is of the same type as the first acceleration and second acceleration, i.e. a lateral acceleration, longitudinal acceleration, vertical acceleration or any combination thereof.

In the present embodiment, the processor 130 determines the further acceleration in parallel, i.e. concurrently, with the determination of the first acceleration and second acceleration.

It is also envisaged that the determination of the first acceleration, second acceleration and further acceleration are carried out separately, i.e. one after the other or at different times to one another.

The further location is between the first location and the second location. The determination of the further acceleration is achieved in the same manner as the determination of the first acceleration and second acceleration.

At step 570, the first acceleration is compared with the measured acceleration data at the first location, in the same manner as step 270 of method 200. If the first acceleration and measured acceleration data are within the predetermined tolerance, the control system 100, applying method 500, makes an initial or preliminary determination that the vehicle 800 is travelling on the route represented by the route data.

The vehicle 800 continues along its route or navigable path until it reaches the further location. At step 581, a further acceleration of the vehicle at or proximate the further location is measured. The acceleration is measured using one or more sensing means as per method 200.

At step 582, the measured acceleration data and further acceleration are compared at and it is determined, for example by the processor 130, whether they are within a predetermined tolerance of one another. As in method 200, the predetermined tolerance will take into account measurement errors and errors in the prediction of the acceleration at the further location.

If it is determined that the measured acceleration data and further acceleration are within the predetermined tolerance, the processor 130 determines that the vehicle is travelling on the route as represented or indicated by the route data.

If it is determined that the measured acceleration data and further acceleration are within the predetermined tolerance, the controller 120 sends a suspension control signal from electrical output 123 to the suspension controller 140 to implement the determined suspension calibration at the suspension 150, prior to the vehicle 800 arriving at the second location.

Therefore, in the present embodiment, the steps 580, 581 & 582 together provide an additional verification step over method 200. This additional verification step helps mitigate false positives, for example situations in which the control system 100 falsely determines that the vehicle 800 is traveling as indicated by route data when, in fact, the vehicle takes an alternative route. In such a case, the determined suspension calibration may not be the optimal calibration for the actual vehicle route. In order for the determined suspension calibration to be implemented, the measured acceleration data and accelerations at both the first location and the further location must be within the predetermined tolerance.

If, at step 582, it is determined that the measured acceleration data and further acceleration are outside of or out with a predetermined tolerance, the processor 130 is arranged to determine that the vehicle 800 is not or is no longer travelling on the route as per the route data. In the present embodiment, method 500 reverts back to step 520 in which route data indicative or representative of a route ahead of the vehicle 800 is received. Further, the suspension calibration at or prior to the time of the comparison step 582 is maintained without change.

Although a single further location is described, this need not be the case. It is envisaged that the acceleration may be determined, and subsequently measured at a plurality of further locations between the first location and the second location. This would create a plurality of verification steps for the control system 100 to determine or verify that the vehicle 800 is travelling on the route as represented by the route data.

In embodiments, the further location(s) may be determined in dependence on the route ahead of the vehicle 800 as indicated by the route data, for example the geometry, bend(s) and/or curvature of the road ahead. In some embodiments, the further location(s) may be determined in dependence on one or more features of the route ahead, for example side roads, tributary roads, fork roads or junctions or any other feature that would enable a vehicle 800 to adjust its route from the route as per the route data.

Figure 6:
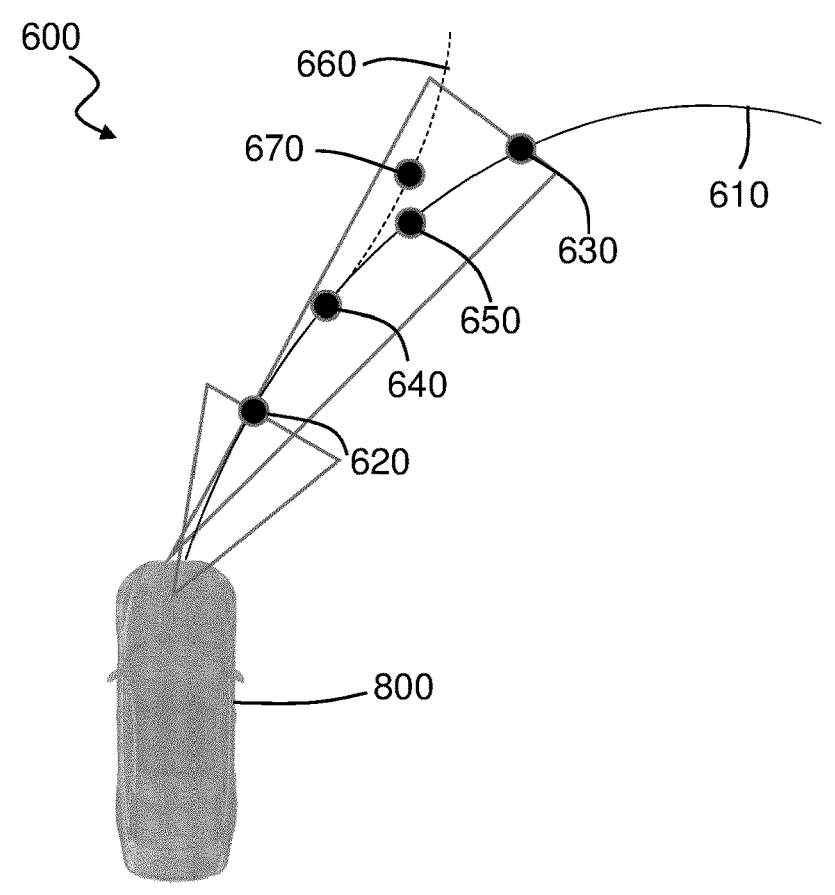
FIG. 6 is a plan view schematically showing a vehicle and planned trajectory according to another embodiment of the invention.

Referring now to FIG. 6, there is shown a schematic of a vehicle 800 having a trajectory 610 extending ahead thereof, the trajectory 610 being similar to that of trajectory 310 described in FIG. 3. The trajectory 610 is represented by route data as per step 520 of the method 500 above. In the present embodiment, the trajectory 610 is indicative of a route ahead of the vehicle 800 and is determined in dependence on the route data.

In embodiments, the trajectory 610 may be defined by a programmed route, for example, a route programmed into a navigation system of the vehicle 800.

As described in method 500, the control system 100 makes a determination of a first acceleration of the vehicle 800 at a first location 620 ahead of the vehicle 800, as per step 530. The first location 620 lies or is positioned along the trajectory 610.

The control system 100 also makes a determination of a further acceleration at two further locations 640, 650 ahead of the vehicle 800. The two further locations, a first further location 640 and second further location 650 lie between the first location 620 and a second location 630. The two further locations 640, 650 and the second location 630 all lie or are positioned along the trajectory 610.

The control system 100 also makes a determination of a second acceleration at second location 630, as per step 540 of method 500. The second location 630 is further distal from a current location of the vehicle 800 than the first location 620 and the two further locations 640, 650.

As described in method 500 above, the measured acceleration data at the first location 620 is compared with the first acceleration. This step allows the control system 100 to make the initial determination that the vehicle 800 is in fact travelling as per the trajectory 610, and therefore travelling as represented by the route data.

In the present embodiment, the actual acceleration of the vehicle 800 is measured when the vehicle 800 arrives at the first further location 640 to produce measured acceleration data. The measured acceleration data is compared with the first further acceleration as per step 582 above. If it is determined that the first further location and measured location are within a predetermined tolerance it is determined that the vehicle 800 is still travelling as per the trajectory 610, and therefore travelling as on the route represented by the route data. This provides a verification step.

If the measured acceleration data and first further acceleration are within the predetermined tolerance, the actual acceleration of the vehicle 800 is measured when the vehicle 800 arrives at the second further location 650 to produce measured acceleration data. The measured acceleration data is compared with the second further acceleration. If it is determined that the second further acceleration and measured acceleration are within a predetermined tolerance it is determined that the vehicle 800 is still travelling as per the trajectory 610. This provides a further verification step that the vehicle 800 is still travelling as pre the trajectory 610, and therefore on the route represented by the trajectory 610.

If, after the further verification step, it is determined that the vehicle 800 is travelling as per the trajectory 610, the control system 100 is arranged to implement the determined suspension calibration prior to the vehicle 800 arriving at the second location 630.

FIG. 6 also illustrates the case in which the vehicle 800 travels on an alternative trajectory 660 from that represented by the route data, i.e. different to trajectory 610. In such a case, the control system 100 will determine at both the first location 620 and the first further location 640 that the vehicle 800 is travelling as per the trajectory 610.

However, in this case the vehicle 800 takes an alternative trajectory 660, diverging from trajectory 610 between the first further location 640 and second further location 650.

Therefore, the measured acceleration data at alternative location 670 will not match, or be within a predetermined tolerance of the second further acceleration. The control system 100, applying method 500, will determine that the vehicle 800 is not travelling as per trajectory 610 and will not implement the determined suspension calibration.

The further verification step based on the second further acceleration reduces the likelihood of false positives, i.e. reduces the likelihood of the control system 100 implementing the determined suspension calibration when the vehicle 800 will not arrive at the second location 630.

Figure 7:
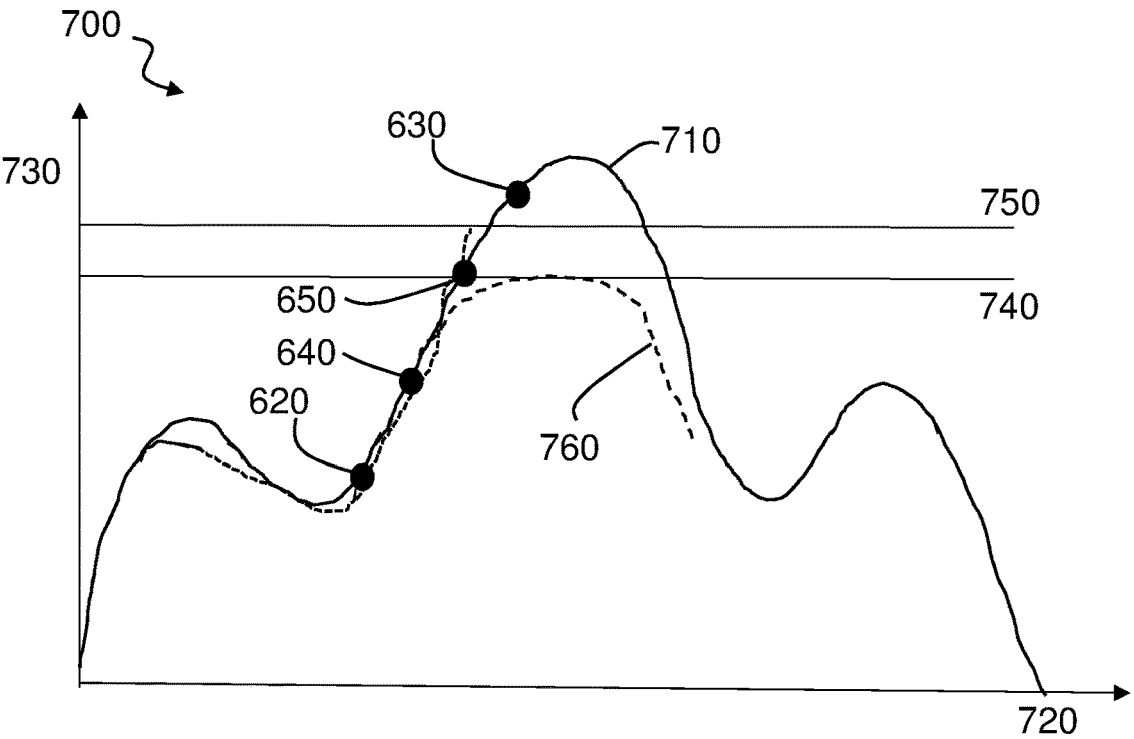
FIG. 7 is a motion profile according to an embodiment of the invention.

Referring now to FIG. 7, there is shown a motion profile 700 according to an embodiment of the invention. In method 500, after the route data is received (step 520), the processor 130 may determine a motion profile 700. The motion profile 700 is an acceleration and deceleration profile in this embodiment.

The motion profile 700 is the same as motion profile 400 but applied to method 500. Like features are denoted by like references leading with '700' rather than '400' and, for conciseness, will not be discussed further.

Shown on the motion profile 700 is first location 620, second location 630, first further location 640 and second further location 650 at their respective positions along the route. The creation of the motion profile 700 allows for continuous monitoring of acceleration as the vehicle 800 travels along the route.

The motion profile 700 shows the effect of the vehicle 800 taking an alternative route from that represented by the route data. Between the first further location 640 and the second further location 650, the vehicle 800 adjusts its route as illustrated by acceleration and deceleration profile 760.

FIG. 7 also shows the alternative case in which the vehicle 800 travels along the route as per the route data. In such a case, if each of the first acceleration, first further acceleration and second further acceleration and measured acceleration data at each of those locations are within the predetermined tolerance, it is determined at the application threshold 740 that the vehicle 800 is travelling on route as represented by the route data and therefore, the control system 100 is arranged to apply the determined suspension calibration prior to the vehicle 800 arriving at the second location 630. The point of activation is defined by the trigger threshold 750.

It will also be appreciated by those skilled in the art that any number of combinations of the aforementioned features and/or those shown in the appended drawings provide clear advantages over the prior art and are therefore within the scope of the invention described herein.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a vehicle, the control system comprising one or more controllers, the control system being configured to:

receive route data indicative of a route ahead of the vehicle;

determine, in dependence on the route data, a prediction of a first acceleration of the vehicle at a first location along a trajectory that is rep es e route data determine, in dependence on the route data, a prediction of a second acceleration of the vehicle at a second location along the trajectory, wherein the second location is further from a current location of the vehicle than the first location;

determine a suspension calibration in dependence on the second acceleration;

receive measured acceleration data corresponding to the first location;

compare the measured acceleration data and the first acceleration;

if the measured acceleration data and the first acceleration are within a predetermined tolerance, then determine that the vehicle is travelling as per the trajectory and output a suspension control signal in dependence on the determined suspension calibration and the comparison;

if the measured acceleration data and the first acceleration are outside a predetermined tolerance, then determine that the vehicle is travelling as per an alternative trajectory from that sonted by the oute data and maintain an existing suspension calibration; and a suspension controller for a vehicle suspension comprising one or more suspension actuators, the suspension controller configured to receive the suspension calibration and, based on the received suspension calibration, control the one or more suspension actuators to implement the suspension calibration prior to the vehicle reaching the second location.

2. The control system according to claim 1, wherein the one or more controllers comprise:

an electrical input configured to receive:

an electrical signal indicative of the route data;

an electrical signal indicative of the measured acceleration data; and

one or more processors configured to:

determine the prediction of the first acceleration of the vehicle at the first location;

determine the prediction of the second acceleration of the vehicle at the second location;

determine the suspension calibration in dependence on the second acceleration;

compare the measured acceleration data and the first acceleration; and determine an electrical output configured to output the suspension control signal.

3. The control system according to claim 1, wherein the control system is configured to determine, in dependence on the route data, a motion profile of the vehicle between the current location of the vehicle and the second location and to determine the prediction of the first acceleration in dependence on the motion profile.

4. The control system according to claim 1, wherein the control system is configured to:

receive measured acceleration data at a further location between the first location and the second location;

determine, in dependence on the route data, a prediction of a further acceleration of the vehicle at the further location;

compare the measured acceleration data at the further location with the further acceleration; and output a suspension control signal to apply the determined suspension calibration prior to the vehicle arriving at the second location in dependence on the measured and predicted accelerations.

5. The control system according to claim 1, wherein the control system is configured to receive maximum acceleration data indicative of a maximum acceleration value.

6. The control system according to claim 5, wherein the maximum acceleration value is a user-determined value and/or selected dependent on a vehicle mode.

7. The control system according to claim 5, wherein the control system is configured to compare the second acceleration with the maximum acceleration value and, if the second acceleration exceeds the maximum acceleration value, to determine the suspension calibration at the second location in dependence on the maximum acceleration value.

8. The control system according to claim 5, wherein the control system is configured to determine, in dependence on the route data, a motion profile of the vehicle between the current location of the vehicle and the second location; and if the second acceleration is predicted to exceed the maximum acceleration value, the motion profile is determined in dependence on the vehicle having the maximum acceleration value at the second location.

9. The control system according to claim 1, wherein the control system is configured to determine the prediction of the second acceleration in dependence on a current speed of the vehicle and the route data.

10. The control system according to claim 9, wherein the control system is configured to predict a vehicle path from the current location to the second location in dependence on the route data.

11. The control system according to claim 10, wherein the route data comprises navigation data.

12. The control system according to claim 1, wherein the acceleration is one or more of lateral acceleration and longitudinal acceleration.

13. The control system according to claim 1, wherein the control system is configured to determine the suspension calibration by determining one or more suspension characteristics; and the one or more suspension characteristics comprise at least one of a suspension controller gain, suspension damping and suspension stiffness.

14. A vehicle comprising a control system according to claim 1.

15. A method of calibrating a vehicle suspension, the method comprising:

receive route data indicative of a route ahead of the vehicle;

determine, in dependence on the route data, a prediction of a first acceleration of the vehicle at a first location along a trajectory represented by the route data;

determine, in dependence on the route data, a prediction of a second acceleration of the vehicle at a second location along the trajectory, wherein the second location is further from a current location of the vehicle than the first location;

determine a suspension calibration in dependence on the second acceleration;

receive measured acceleration data corresponding to the first location;

compare the measured acceleration data and the first acceleration;

if the measured acceleration data and the first acceleration are within a predetermined tolerance, then determine that the vehicle is travelling as per the trajectory and output a suspension control signal in dependence on the determined suspension calibration and the comparison;

if the measured acceleration data and the first acceleration are outside a predetermined tolerance, then determine that the vehicle is travelling as per an alternative trajectory from that represented by the route data and maintain an existing suspension calibration; and a suspension controller for a vehicle suspension comprising one or more suspension actuators, the suspension controller configured to receive the suspension calibration and, based on the received suspension calibration, control the one or more suspension actuators to implement the suspension calibration prior to the vehicle reaching the second location.

16. A non-transitory computer readable medium carrying computer readable code which when executed causes a vehicle to carry out the method according to claim 15.

17. The control system according to claim 1, wherein the suspension controller is configured to, based on the received suspension calibration, control the one or more suspension actuators to implement the suspension calibration at a predetermined distance from the second location.

18. The control system according to claim 1, wherein the control of the one or more suspension actuators to implement the suspension calibration includes adjusting at least one of a suspension stiffness or a suspension damping.

* * * * *